United States Patent
Kodaka et al.

[11] Patent Number: 6,148,943
[45] Date of Patent: Nov. 21, 2000

[54] VEHICLE BEHAVIOR CONTROL SYSTEM

[75] Inventors: Kenji Kodaka; Yoichi Sugimoto; Tomoyuki Shinmura; Shohei Matsuda, all of Wako, Japan

[73] Assignee: Honda Giken Kogyo Kabushiki Kaisha, Tokyo, Japan

[21] Appl. No.: 09/232,806

[22] Filed: Jan. 19, 1999

[30] Foreign Application Priority Data

Jan. 19, 1998 [JP] Japan .................................. 10-021427

[51] Int. Cl.$^7$ ...................................................... B62D 1/24
[52] U.S. Cl. ......................... 180/169; 180/401; 180/446; 303/193; 701/42
[58] Field of Search .................................. 180/167, 169, 180/401, 422, 446; 303/140, 146, 193, 194; 701/41, 42

[56] References Cited

U.S. PATENT DOCUMENTS

| | | | |
|---|---|---|---|
| 4,664,211 | 5/1987 | Oshita et al. ............................ | 180/446 |
| 4,834,205 | 5/1989 | Mizuno et al. ............................ | 701/42 |
| 5,053,966 | 10/1991 | Takahashi et al. ......................... | 701/42 |
| 5,680,097 | 10/1997 | Uemura et al. ............................ | 701/42 |
| 5,899,289 | 5/1999 | Uematsu et al. .......................... | 180/169 |
| 5,996,725 | 12/1999 | Nishino et al. ........................... | 180/446 |

FOREIGN PATENT DOCUMENTS 6-298022  10/1994  Japan .

*Primary Examiner*—Michael Mar
*Attorney, Agent, or Firm*—Arent Fox Kintner Plotkin & Kahn, PLLC

[57] ABSTRACT

A system for controlling behavior of a vehicle having a laser radar for detecting an obstacle present on a road on which the vehicle is traveling and operating the brake automatically to avoid contact with the obstacle, and having a power-assist steering actuator including an electric motor installed in the steering system. In the system, it is determined whether the vehicle is steered by the steering wheel as manipulated by the vehicle operator or the vehicle is steered by a force generated by the interplay between the tire and road due to the automatic braking and, when vehicle is steered by the force generated by the tire/road interplay, the electric motor of the steering actuator is controlled to drive in the direction to cancel the force, thereby preventing the vehicle behavior from degrading to deviate from the desired course of travel and preventing various disadvantages such as failure to achieve the desired obstacle detection necessary for an effective obstacle avoidance control.

10 Claims, 8 Drawing Sheets

VEHICLE BEHAVIOR CONTROL SYSTEM

BACKGROUND OF THE INVENTION

1. Field of the Invention

This invention relates to a vehicle behavior control system, more particularly to a vehicle behavior control system to control vehicle behavior so as to overcome an unintentional steering wheel movement caused by a force generated by a tire/road interplay (interface friction) due to a sudden automatic braking produced under obstacle avoidance control.

2. Description of the Related Art

There have hitherto been proposed obstacle avoidance controls. For example, Japanese Laid-open Patent Application Hei 6(1994)-298022 teaches detecting an obstacle (e.g., another vehicle running ahead on the road) with the use of an obstacle detector such as a laser radar and automatically operating the braking system (i.e., independently of the vehicle operator's brake pedal manipulation) so as to avoid contact with the obstacle.

In the prior art technique, specifically, the acceleration of the other vehicle (obstacle) is detected and, based on the detected acceleration, a first threshold value (relative distance) for avoiding the obstacle by braking is determined. At the same time, a second threshold value (relative distance) for avoiding the obstacle by steering is determined based on the assumption that the subject vehicle moves to avoid the another vehicle with a lateral acceleration b0 after time τ, measured from a certain point.

In such an obstacle avoidance control, the braking system is operated automatically to immediately produce large braking forces when the possibility of contact with the obstacle is found to be great. When the vehicle is running on rough terrain where the coefficient of tire/road interface friction is relatively great, a force generated by the tire/road interplay (interface friction) due to the produced sharp braking forces may sometimes cause the steering wheel to be moved other than as intended by the vehicle operator, thereby causing the vehicle to deviate from the course of vehicle travel intended by the vehicle operator.

Similar problems may arise from the large automatic braking forces when the vehicle is running on a road where the coefficients of tire/road interface friction acting on the left and right wheels are different from each other.

When this happens, the tires are subjected to side force which lowers the gripping force in the vehicle longitudinal direction. As a result, the vehicle driving behavior is degraded, which may sometimes cause the vehicle to deviate from the desired course of travel as mentioned above. This also causes other problems to arises. For example, the vehicle may fail to attain the desired deceleration or it may fail to achieve the desired obstacle detection necessary for an effective obstacle avoidance control.

Aside from the above, it has been known to equip a power-assisted steering actuator in the steering system such that the steering force produced by the muscular energy of the vehicle operator is assisted by the steering actuator.

SUMMARY OF THE INVENTION

An object of the invention is therefore to overcome the foregoing problems and to provide a vehicle behavior control system having a power-assist steering actuator in the steering system, which controls to operate the steering actuator, when the steering wheel is unintentionally rotated by the force generated by the tire/road interface interplay due to a sudden automatic braking produced under obstacle avoidance control, so as to cancel the unintentional steering wheel movement, thereby preventing the various problems mentioned above from arising.

To achieve these object, the invention provides a system for controlling behavior of a vehicle having at least a brake and a steering system including a steering wheel to be manipulated by a vehicle operator, comprising: automatic braking control means having an obstacle detector for detecting an obstacle present on a road on which the vehicle is traveling and for operating the brake automatically to avoid contact with the obstacle when a possibility of contact is found to exist; a steering actuator installed in the steering system for steering wheels of the vehicle in a desired direction; steering condition determining means for determining a condition of steering of the vehicle whether the vehicle is steered by the steering wheel manipulated by the vehicle operator or the vehicle is steered by a force generated by an interplay between the wheel and road; and steering actuator control means for controlling the steering actuator to cancel the force generated by the interplay between the wheel and road if the vehicle is determined to be steered by the force when the brake is operated automatically.

BRIEF EXPLANATION OF DRAWINGS

This and other objects and advantages of the invention will be made more apparent by the following description and drawings, in which.

DETAILED DESCRIPTION OF THE PREFERRED EMBODIMENTS

Embodiments of the invention will now be explained with reference to the attached drawings.

Figure 1:
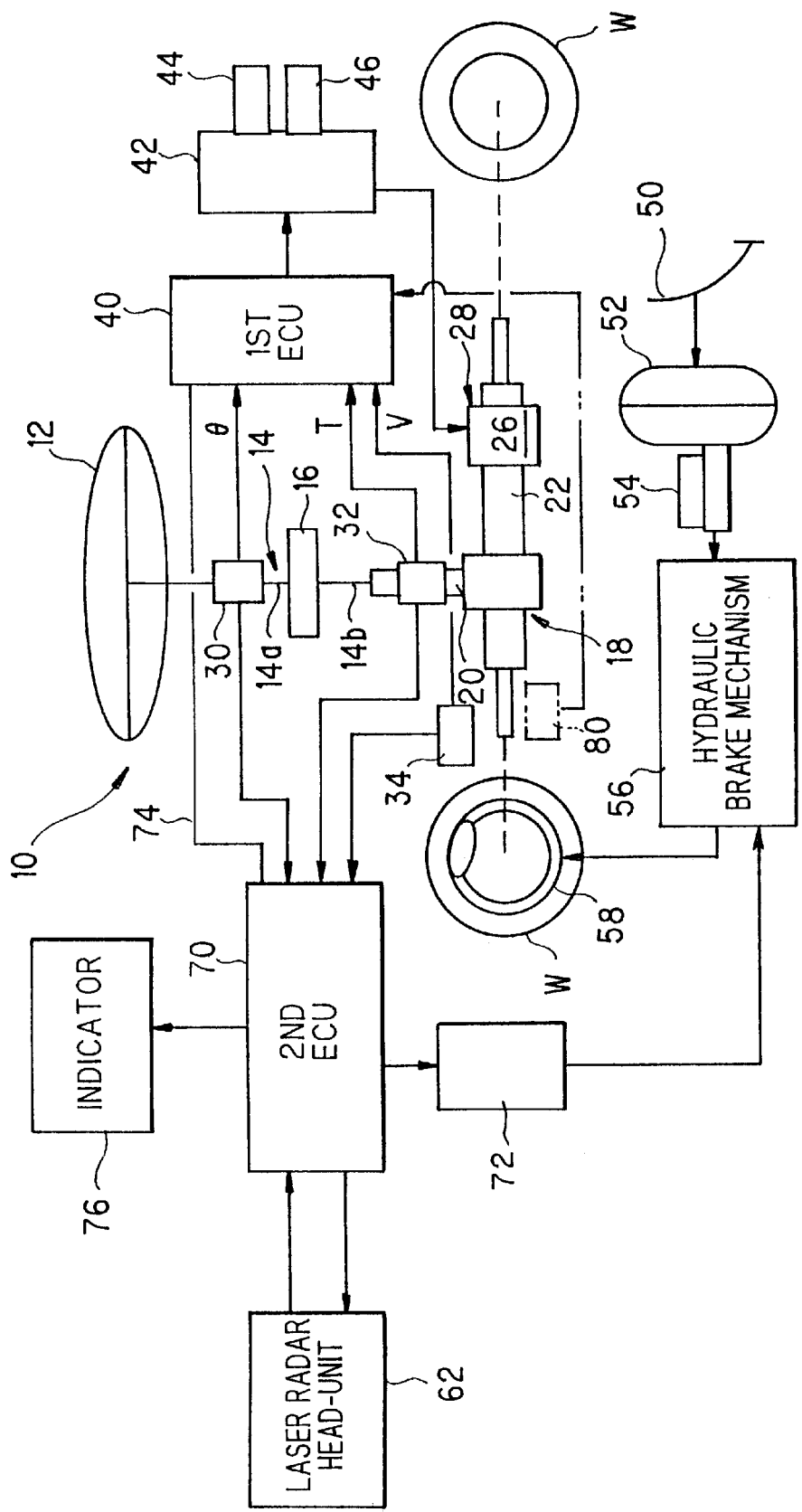
FIG. 1 is an overall schematic view showing the configuration of a vehicle behavior control system according to the invention.

FIG. 1 is an overall schematic view showing the configuration of a vehicle behavior control system according to the invention.

In the figures, reference numeral 10 designates a vehicle which has a steering wheel 12 installed at the vehicle operator's seat to be manually operated by the vehicle operator. The steering wheel 12 is connected to a steering shaft 14 comprised of a upper shaft 14a and a lower shaft 14b which are connected together by an elastic joint 16 made of an elastic material such as rubber for preventing high-frequency-vibration from being transmitted from the road to the steering wheel 12 via wheels W.

The steering lower shaft 14b is connected to a pinion 20 of a rack-and-pinion steering gear assembly 18. The pinion 20 is engaged or meshed with a rack 22 in the steering gear assembly 28. Rotary motion input from the steering wheel 12 by the vehicle operator passes through the pinion 20 to be converted into linear motion of the rack 22 in the steering gear assembly 18. The linear motion passes through tie rods (steering rods; not shown) at the opposite ends of the front axle to turn two front wheels (steered wheels) in the direction input around the associated king pins (not shown) via the steering wheel 12 by the vehicle operator.

In the steering system illustrated, an electric motor 26 and a ball-screw mechanism (not shown) are disposed coaxially with the rack 22 to constitute a steering actuator 28. The output rotation of the motor 26 is converted into linear motion of the rack 22 by the ball-screw mechanism so as to move the rack 22 in the direction that assists or reduces the steering force (steering torque) input via the steering wheel 12 by the vehicle operator.

A steer angle sensor 30 (made up of a rotary encoder, etc.,) is provided in the vicinity of the steering shaft 14 and outputs a signal indicative of the amount of steering, more precisely the direction and magnitude of the steer angle θ input by the vehicle operator. A torque sensor 32 is provided in the vicinity of the steering gear assembly 28 (at a position closer to the front wheels than that of the steer angle sensor) and outputs a signal indicative of the amount of steering, more precisely the direction and magnitude of the steering force (steering torque) T input by the vehicle operator. Thus, the words "amount of steering" indicate the amount of change produced at a portion between the steering wheel 12 to the wheels W including the forces (torques) and amounts such as the steer angle, the steering force, the stroke of rack, etc., as will later be referred to.

Wheel speed sensor 34 is provided one in the vicinity of each of the wheels W (only front ones shown) and outputs a signal once every rotation of the associated wheels. The front wheels are powered by an engine (not shown) mounted at the front of the vehicle 10. The rear wheels are idle.

The output signals of the sensors are sent to a first ECU (Electronic Control Unit) 40. The first ECU is comprised of a microcomputer and detects the steer angle θ input by the vehicle operator from the output signal of the steer angle sensor 30, the steering torque (force) T acting on the steering system from the output signal of the torque sensor 32, and the road speed V of the vehicle 10 by counting the number of the output signals of the wheel speed sensor 34.

Based on the detected values, the first ECU 40 determines a command (current command, more precisely a command in duty-ratio in Pulse Width Modulation) to be supplied to the electric motor 26 of the steering actuator 28 and outputs, via a driver circuit 42, to the motor 26 so as to drive or control the same.

Figure 2:
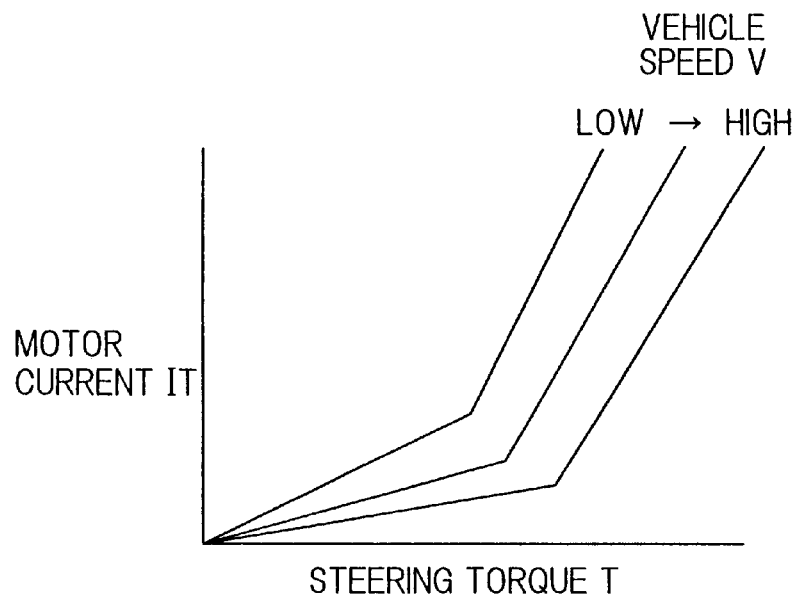
FIG. 2 is an explanatory graph showing the conventional power-assist characteristics of a power-assist steering actuator illustrated in FIG. 1 taking as an example when the vehicle is steered in the right-hand direction.

More specifically, the first ECU 40 is programmed to retrieve a map (mapped data; whose characteristics are shown in FIG. 2) using the detected direction and magnitude of the steering torque T and the vehicle (road) speed V as address data to calculate or determine a current command It to be supplied to the electric motor 26 of the steering actuator 28 in such a way that the steering actuator 28 assists the steering force input by the vehicle operator. Thus, the characteristics shown in FIG. 2 are those of a conventional power-assisted steering. FIG. 2 illustrates the case where the steering wheel 12 is moved in the right-hand direction.

Moreover, there are installed in the vicinity of the driver circuit 42 a current sensor (ammeter) 44 which generates a signal indicative of the current supplied to the electric motor 26 and a voltage sensor 46 which generates a signal indicative of the voltage applied to the electric motor 26, so as to monitor the operation of the electric motor 26. The output signals of the sensors are similarly sent to the first ECU 40. (In FIG. 1, the connection between the sensors and the ECU 40 is omitted for simplicity.)

The vehicle 10 is provided with a foot brake (brake pedal) 50 which is placed on the floor below the vehicle operator's seat. The foot brake 50 is connected to a negative-pressure booster (master back) 52 which has a diaphragm (not shown) which partitions the inside of the booster into two chambers such that the ratio of the negative pressure introduced from the engine intake system (not shown) relative to the atmospheric pressure introduced from outside of the engine is regulated to determine the position of the diaphragm which determines the force to boost the vehicle operator's brake pedal depression.

The negative-pressure 52 is connected to a master cylinder 54 which supplies, via oil paths (not shown), hydraulic pressure (brake fluid pressure), at a pressure in response to the depression force, to a hydraulic brake mechanism 56 having units of valves for pressure increase and decrease. The hydraulic brake mechanism 56 is connected to a brake 58 having a brake caliper, etc., provided at the respective front and rear wheels W to slow or stop the rotation thereof. Thus, the vehicle is slowed and stopped at a rate of deceleration determined by the braking force. The above refers to braking as operated by the vehicle operator.

Further, the vehicle 10 is provided with a head-unit of laser radar (or lidar) 62 which is mounted in the proximity of the front bumper (not shown) and emits a laser beam (a narrow beam of coherent, powerful and nearly nonchromatic electromagnetic radiation energy) horizontally along the course of vehicle travel and receives an energy reflected from an obstacle or object (such as another vehicle present ahead of the subject vehicle 10).

The head-unit of laser radar 12 is connected to a second ECU (Electronic Control Unit) 70 which is similarly comprised of a microcomputer and includes a radar output processing ECU (not shown) which is also comprised of a microcomputer. The radar output processing ECU detects the distance (relative distance) to an obstacle or object from the vehicle 10 by measuring the time interval between transmission of the energy and reception of the reflected energy, which establishes the range of the obstacle in the beam's path. Moreover, the laser radar output processing ECU detects the (relative) speed of the obstacle by differentiating the measured distance, and detects the direction or orientation of the obstacle from the reflected energy.

The output signals of the steer angle sensor 30, the torque sensor 32 and the wheel speed sensor 34, as well as the radar output processing ECU are sent to the second ECU 70. Based thereon, the second ECU 70 is programmed to determine the possibility of contact with the obstacle and when the possibility of contact is determined to be great, generates a command signal, via a driver circuit 72, to the hydraulic brake mechanism 56 to drive the valve units in the hydraulic brake mechanism 56 such that the brake 58 is automatically operated to brake the vehicle 10 (i.e., to decelerate independently of the vehicle operator's brake pedal depression) so as to avoid the contact with the obstacle.

Figure 3:
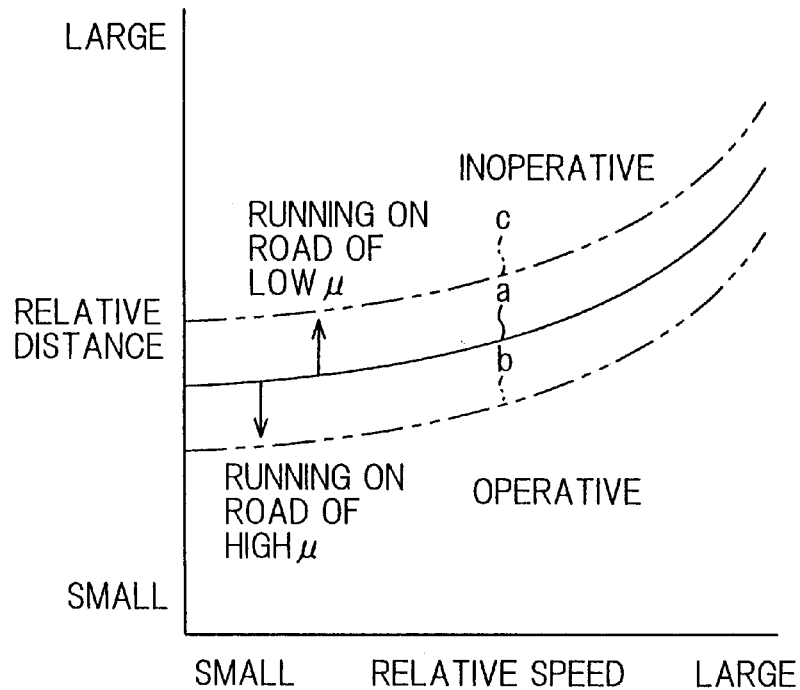
FIG. 3 is an explanatory graph showing the characteristics of the relative distance (threshold value) between the vehicle and an obstacle for determining the necessity of automatic braking operation in obstacle avoidance control conducted in the system illustrated in FIG. 1.

Explaining this with reference to FIG. 3, the second ECU 70 is programmed to retrieve a map (mapped data) shown there by the relative speed (between the subject vehicle 10 and the obstacle) and the relative distance (from the subject vehicle 10 to the obstacle) to determine whether the brake 58 should be operated automatically. To be more specific, the second ECU 70 retrieves a threshold relative distance in accordance with the characteristic a using the relative speed as address datum and when the detected distance becomes less than the threshold value, it automatically operates the brake 58 via the hydraulic brake mechanism 56 to slow or stop the vehicle 10.

The first ECU 40 and the second ECU 70 are connected together with a signal line 74 in such a way that the second ECU 70 generates and sends the automatic braking operation signal to the first ECU 40 when the second ECU 70 determines to conduct the automatic braking. At the same time, the second ECU 70 alerts, via an indicator 76 (audio system or visible indicator), the vehicle operator to be prepared for the automatic braking which will soon be conducted. Moreover, the second ECU 70 alerts, via the indicator 76, the vehicle operator when the detected relative distance becomes less than a predetermined value so as to invite him to manually operate the foot brake 50.

Thus, the first ECU 40 is programmed to assist the vehicle operator's steering via the electric motor 26 in the steering actuator 28, while the second ECU 70 is programmed to operate the brake 58 automatically via the hydraulic brake mechanism 56 so as to avoid the contact with the obstacle.

The operation of the vehicle behavior control system according to the invention will next be explained.

Figure 4:
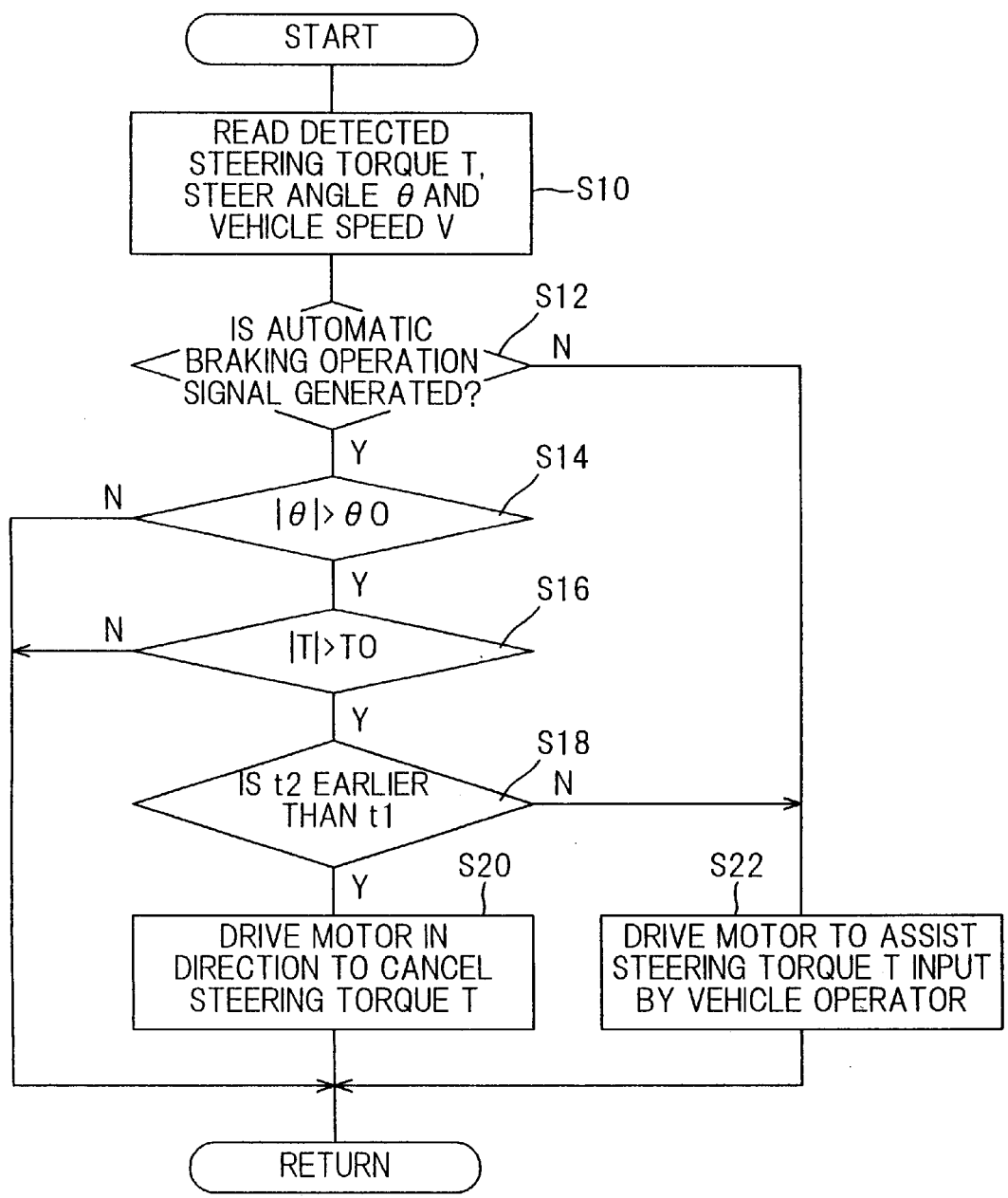
FIG. 4 is a flow chart showing the operation of the vehicle behavior control system according a first embodiment of the present invention.

FIG. 4 is a flow chart showing the operation of the system conducted by the first ECU 40 of the system.

Figure 5:
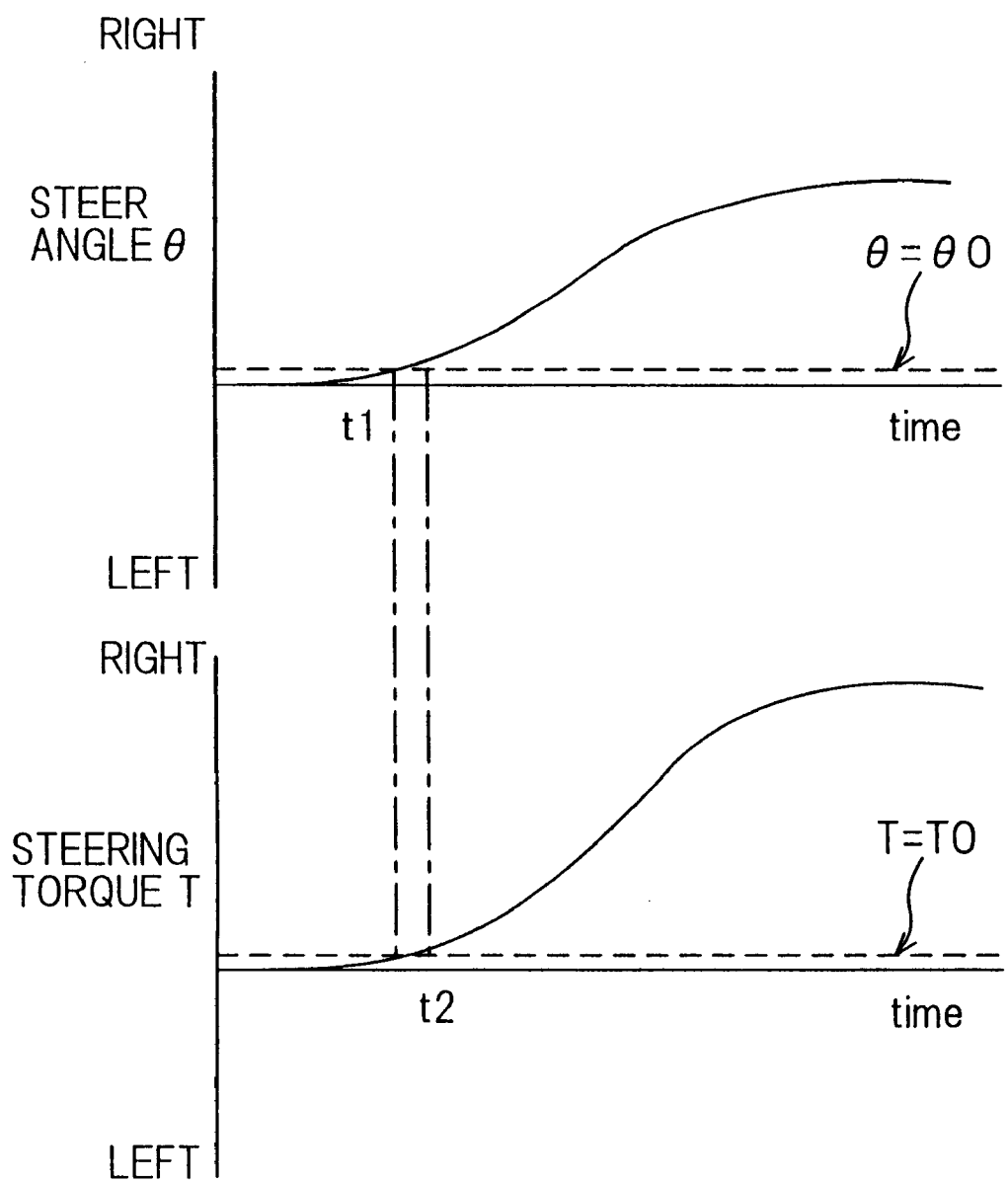
FIG. 5 is an explanatory graph showing the determination of a condition of the vehicle steering using detected steer angle θ and steering torque T when the vehicle is steered by a steering wheel moved by the vehicle operator referred to in the flow chart of FIG. 4.
Figure 6:
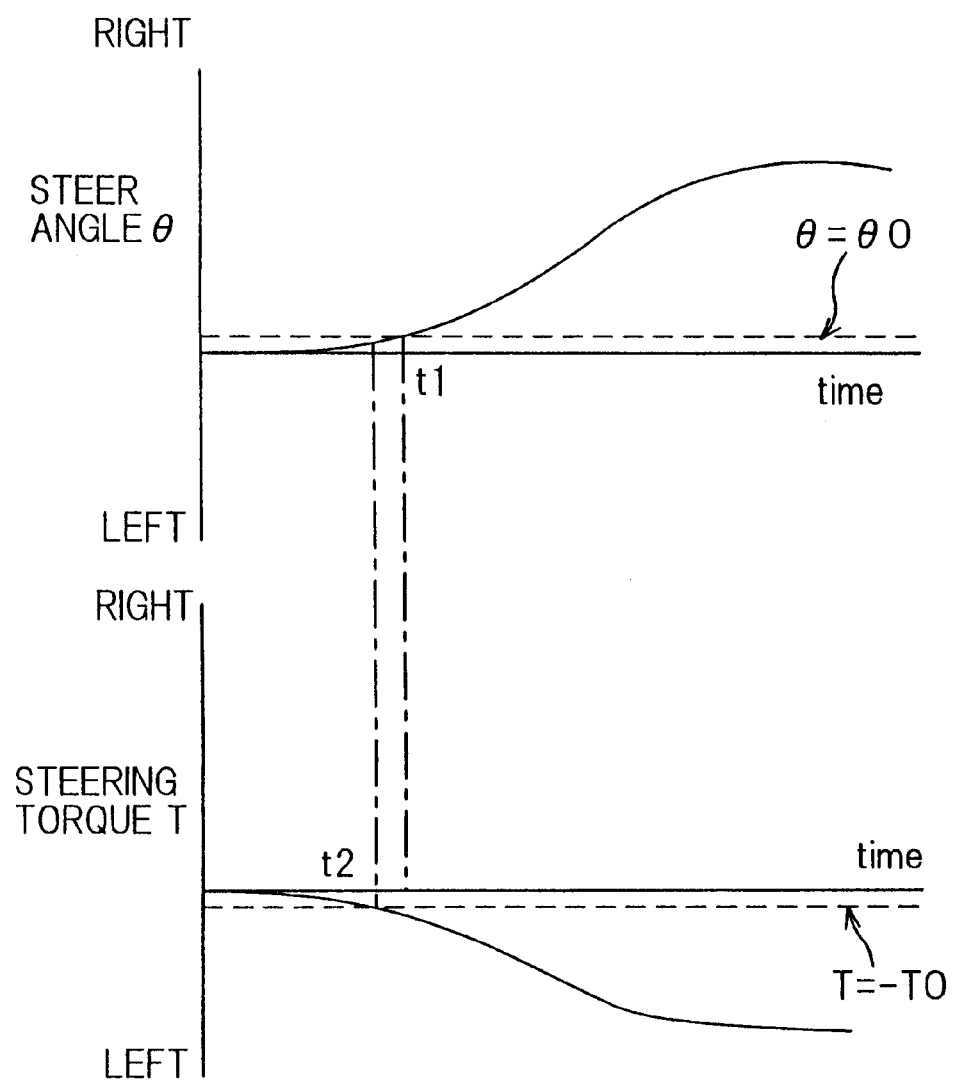
FIG. 6 is an explanatory graph showing the determination of a condition of the vehicle steering using detected steer angle θ and steering torque T when the vehicle is steered by a force generated by the tire/road interplay referred to in the flow chart of FIG. 4.

Before entering the explanation of the flow chart, however, the operation of the system is briefed with reference to FIGS. 5 and 6.

When the steering wheel 12 is moved by the vehicle operator, as illustrated in FIG. 5, a time t1 at which the detected steer angle θ exceeds a reference value (appropriately set positive value) θ0 is normally earlier (in time) than a time t2 at which the detected steering torque T exceeds a reference value (appropriately positive value) T0. In the specification and figures, the case where the steering wheel 12 is moved in the right-hand direction is taken as an example and the value in that direction is assumed as positive (plus).

On the other hand, when the steering wheel 12 is moved by the road, more precisely by the force generated by the tire/road interplay (interface friction), as illustrated in FIG. 6, the time t2 (at which the detected steering torque exceeds the reference value T0) is earlier (in time) than the time t1 (at which the detected steer angle θ exceeds the reference value θ0).

Thus, it is possible to determine the condition of steering whether the steering wheel 12 is moved by the vehicle operator or by the road, i.e., the force generated by the tire/road interplay. The invention is made based on this conception.

Explaining the flow chart, the program begins in S10 in which the detected steering torque T, the steer angle θ and the vehicle speed V are read, and proceeds to S12 in which it is determined whether the automatic braking operation signal is generated and sent from the second ECU 70.

When the result is affirmative, the program proceeds to S14 in which it is determined whether the absolute value of the detected steer angle θ exceeds the reference value θ0. When the result is affirmative, the program proceeds to S16 in which it is determined whether the absolute value of the detected steering torque T exceeds the reference value T0.

When the result is affirmative, the program proceeds to S18 in which the time t1 (at which the absolute value of the steer angle θ exceeds the reference value θ0) is compared with the time t2 (at which the absolute value of the steering torque T exceeds the reference value T0) to determine whether the time t2 is earlier (in time) than the time t1.

When the result is affirmative, since this indicates that the steering wheel is moved by the road (i.e., the vehicle is steered by the force generated by the tire/road interplay), the program proceeds to S20 in which the current command It is calculated and supplied to the electric motor 26 via the driver circuit 42 to drive (control) the electric motor 26 in a direction in which the detected torque T is canceled (or decreased).

Figure 7:
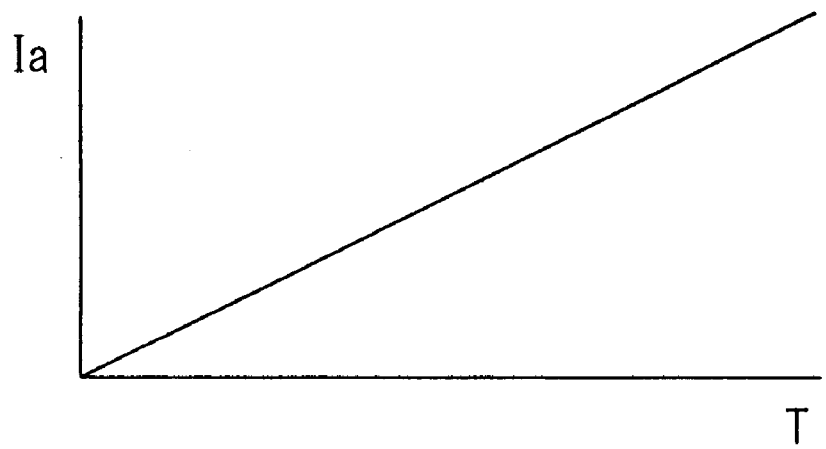
FIG. 7 is an explanatory graph showing the characteristic of a current to be supplied to an electric motor installed in the steering system illustrated in FIG. 1 so as to cancel the force generated by the tire/road interplay referred to in the flow chart of FIG. 4.
Figure 8:
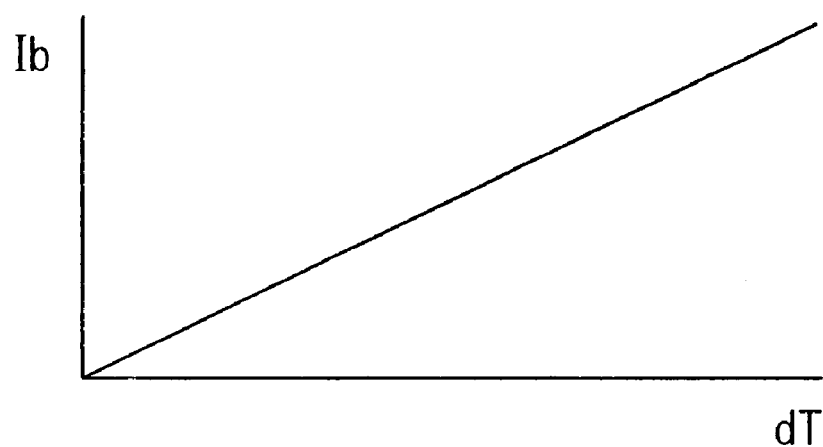
FIG. 8 is an explanatory graph, similar to FIG. 7, but showing the characteristic of an additional current to be supplied to an electric motor installed in the steering system illustrated in FIG. 1 so as to cancel the force generated by the tire/road interplay referred to in the flow chart of FIG. 4.

More specifically, tables (table data whose characteristics are shown in FIGS. 7 and 8) are retrieved using the detected steering torque T and its differential dT (differential of the detected steering torque T) to calculate current values Ia, Ib. The retrieved current values are added together to calculate the sum (the current command It) as:

It=Ia+Ib.

The detected steering torque T at this instant corresponds to the force (generated by the tire/road interplay) moving the steering wheel 12 in a direction unintended by the vehicle operator. Therefore, by determining the current command using the parameters indicative of the force T and its differential (indicative of the change of speed) dT and by supplying current to the electric motor 26 such that the electric motor rotates in the direction to cancel (decrease) the unintentional force, a free movement of the steering wheel 12 is immediately restored.

In the flow chart, when the result in S12 or S18 is negative, on the other hand, the program proceeds to S22 in which the current command is determined using the characteristics shown in FIG. 2 to assist the steering force input by the vehicle operator and is supplied to the electric motor 26 via the driver circuit 42 such that the electric motor 26 rotates in the same direction as the polarity of the detected torque T in the conventional power-assist manner. With this, the vehicle operator's steering is assisted without interfering with his or her steering. Similarly, the control in S20 is discontinued when the automatic braking, once conducted, is discontinued.

When the result in S14 or S16 is negative, the program is immediately terminated. Similarly, the control in S20, once conducted, is discontinued when the result in S14 or S16 becomes negative.

Having been configured in the foregoing manner, even when the force, generated by the tire/road interplay (interface friction) due to a sharp automatic braking under the obstacle avoidance control, acts to move the steering wheel 12 other than as intended by the vehicle operator, the vehicle behavior control system according to the embodiment can produce the steering force (in response to the generated unintentional force) to immediately cancel the unintentional steering wheel movement, thereby preventing the vehicle behavior from being degraded to, for example, deviate form the desired course of vehicle travel.

The system can also solve the aforesaid problems when the vehicle is running on a road where the coefficients of tire/road interface friction $\mu$ acting on the left and right wheels different from each other.

Using a system according to the invention, in the above situations the tires are not subjected to the side force and hence, the gripping force in the vehicle longitudinal direction is not lowered, thus preventing any other problems such as a failure in obstacle detection from arising. The system makes it possible to conduct the automatic braking for obstacle avoidance effectively on any roads. Moreover, since the vehicle behavior control is limited to the situation in which the steering wheel 12 is moved by the tire/road forces, the control will not interfere with the steering of the vehicle operator.

Figure 9:
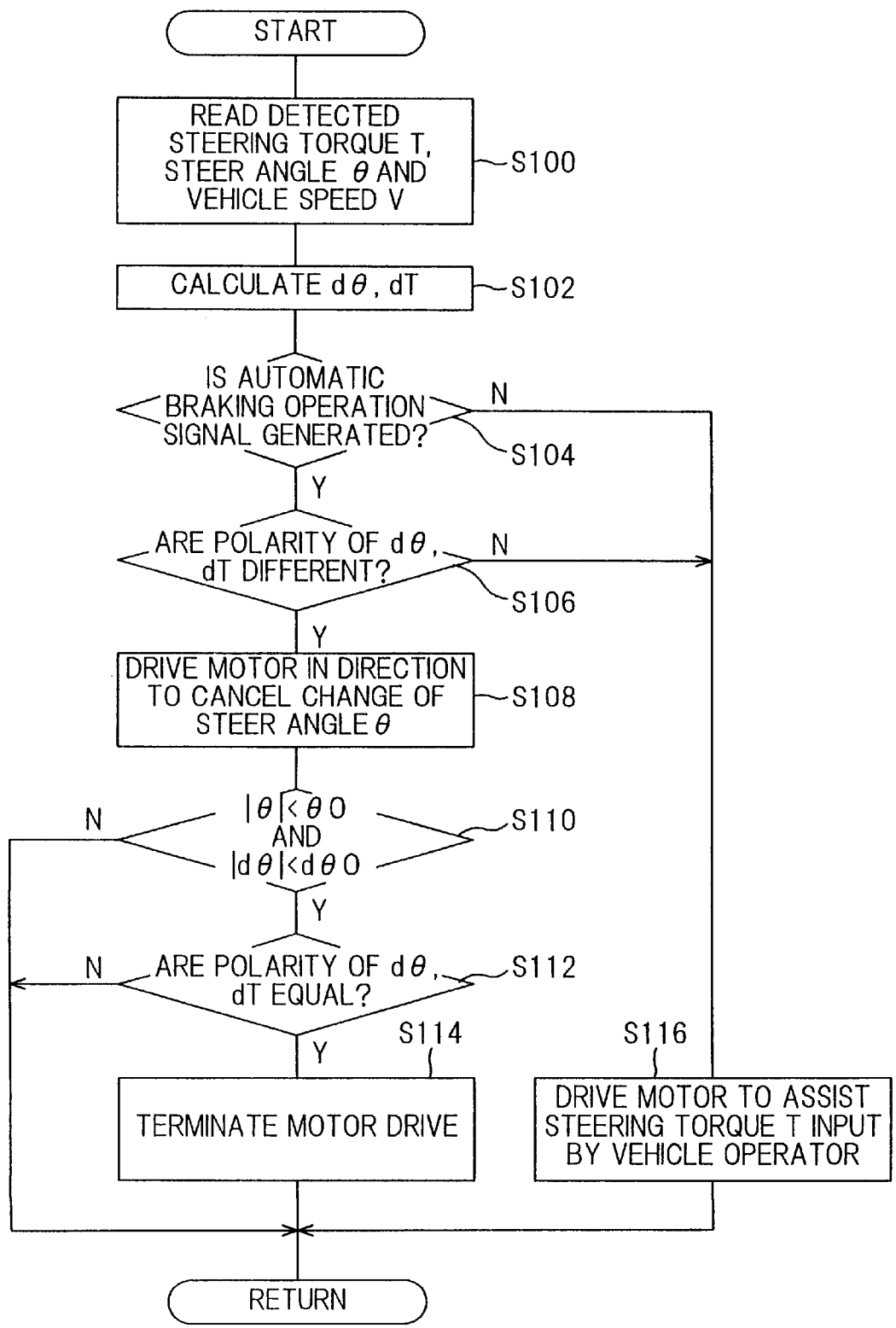
FIG. 9 is a flow chart, similar to FIG. 4, but showing the operation of the vehicle behavior control system according to a second embodiment of the present invention.

FIG. 9 is a flow chart, similar to FIG. 4, but showing the operation of the system according to a second embodiment of the invention.

Explaining the flow chart, the program begins in S100 in which the parameters are read in the same manner as in S10 in the flow chart of FIG. 4 and proceeds to S102 in which the differential $d\theta$ of the detected steer angle $\theta$ (i.e, $d\theta$ indicates the steer angular velocity) and the differential $dT$ of the detected steering torque $T$ are calculated.

The program then proceeds to S104 in which it is similarly determined whether the automatic braking operation signal is generated and sent from the second ECU 70. When the result is affirmative, the program proceeds to S106 in which it is determined whether the polarity of the values $d\theta$ and $dT$ are different from each other.

Explaining the operation of the system in the second embodiment again referring to FIGS. 5 and 6, when the steering wheel 12 is moved by the vehicle operator, as illustrated in FIG. 5, the sign of the values $d\theta$, $dT$ which indicates the direction in which the steering wheel 12 is rotated, i.e., the polarity of the values $d\theta$, $dT$ become equal (in other words, they are in phase). On the other hand, when the steering wheel 12 is moved by the force generated by the tire/road interplay, as illustrated in FIG. 6, the polarity (sign) of the values $d\theta$, $dT$ are opposite to each other (in other words, they are out of phase).

This is because when the steering wheel 12 is moved, for example, in the right-hand direction by the force generated by the tire/road interplay, a force to suppress it, i.e., the steering torque occurs in the opposite direction, i.e., in the left-hand direction. This means that when the steering wheel 12 is rotated by the force generated by the tire/road interplay, the values $d\theta$, $dT$ indicative of the direction of steering wheel movement becomes different in polarity. The second embodiment is made based on this conception.

Returning to the explanation of the flow chart, when the result in S106 is affirmative, since this means that the steering wheel 12 is moved by the force generated by the tire/road interplay, the program proceeds to S108 in which the current command It is determined and supplied to the electric motor 26 via the driver circuit 42 to drive the motor to move the steering wheel 12 in a direction in which the detected change of steer angle $\theta$ is canceled, specifically, in a direction in which the detected steer angle $\theta$ is decreased.

Figure 10:
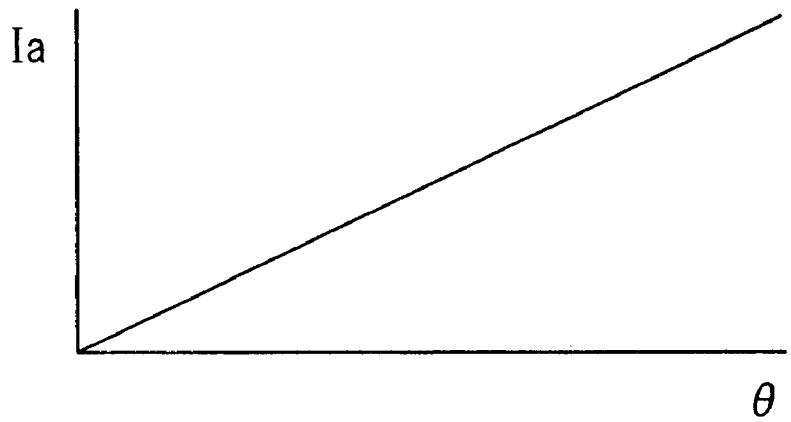
FIG. 10 is an explanatory graph, similar to FIG. 7, but showing a characteristic of the current as referred to in the flow chart of FIG. 9.
Figure 11:
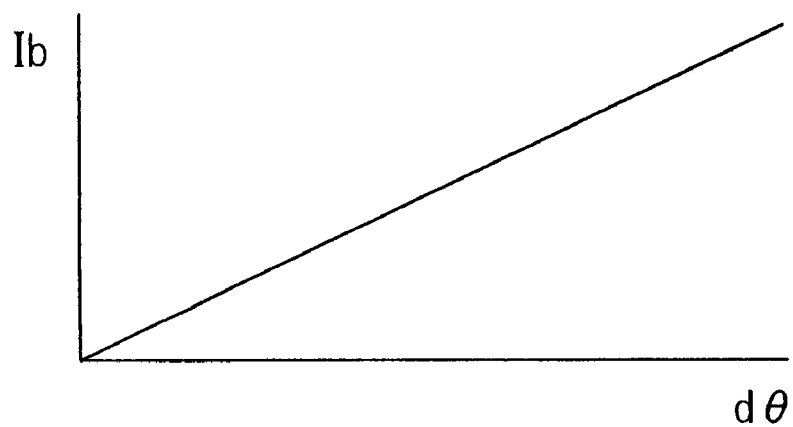
FIG. 11 is an explanatory graph, similar to FIG. 8, but showing a characteristic of the current as referred to in the flow chart of FIG. 9.

More specifically, tables (table data whose characteristics are shown in FIGS. 10 and 11) are retrieved using the detected steer angle $\theta$ and its differential $d\theta$ (differential of the detected steer angle $\theta$) to calculate or determine current values Ia, Ib. The retrieved current values are added together to calculate the sum (the current command It) as:

$$It = Ia + Ib.$$

The program then proceeds to S110 in which it is determined whether the absolute value of the steer angle $\theta$ is less than the reference value $\theta 0$ and the absolute value of the differential $d\theta$ is less than a reference value $d\theta 0$ (which is appropriately set). When the result is affirmative, the program proceeds to S112 in which it is determined whether the polarity of the values $d\theta$ and $dT$ becomes equal.

When the result is affirmative, since this means the unintentional steering wheel movement is canceled or solved, the program proceeds to S114 in which the drive of the electric motor 26 in the direction to cancel the change of steer angle $\theta$ is discontinued so as to avoid interference with the vehicle operator's steering. Here, as mentioned above, the values $\theta 0$, $d\theta 0$ can be set appropriately. The steering torque can be used instead of the steer angle.

When the result in S104 or S106 is negative, the program proceeds to S116 in which the current command is determined using the characteristics shown in FIG. 2 to assist the steering force input by the vehicle operator and is supplied to the electric motor 26 via the driver circuit 42 such that the electric motor 26 rotates in the same direction as that of the detected torque T, in the conventional power-assist manner. Similarly, the control in 108 is discontinued when the automatic braking, once conducted, is discontinued. When the result in S110 or S112 is negative, the program is immediately terminated. Similarly, the control in S108, once conducted, is discontinued when the result in S110 or S112 becomes negative.

Having been configured in the foregoing manner, even when the force generated by the tire/road interplay (interface friction) due to a sharp automatic braking under the obstacle avoidance control acts to move the steering wheel 12 other than as intended by the vehicle operator, the vehicle behavior control system according to the second embodiment can generate the steering force (in response to the generated unintentional force) to immediately cancel the unintentional steering wheel movement, thereby preventing the vehicle behavior from being degraded to, for example, deviate from the desired course of vehicle travel. The system according to the second embodiment can solve the aforesaid problems when the vehicle is running on a road where the coefficients of tire/road interface friction $\mu$ acting on the left and right wheels are different from each other.

As in the first embodiment, the tires are not subjected to side force and hence, the gripping force in the vehicle longitudinal direction is not lowered, thus preventing any other problems such as a failure in obstacle detection from arising. The system according to the second embodiment similarly makes it possible to conduct the automatic braking for obstacle avoidance effectively on any roads. Moreover, since the vehicle behavior control is limited to the situation in which the steering wheel 12 is moved by the tire/road forces, the control will not interfere with the steering of the vehicle operator.

The embodiment is thus configured to have a system for controlling behavior of a vehicle (10) having at least a brake (hydraulic brake mechanism 56, brake 58, etc.) and a steering system including a steering wheel (12) to be manipulated by a vehicle operator, comprising: automatic braking control means (second ECU 70) having an obstacle detector (head-unit of laser radar 12) for detecting an obstacle present on a road on which the vehicle is traveling and for operating the brake (brake 58) automatically to avoid contact with the obstacle when a possibility of contact is found to exist; a steering actuator (18) installed in the steering system for steering wheels of the vehicle in a desired direction; steering condition determining means (first ECU 40, S14 to S18, S106) for determining a condition of steering of the vehicle whether the vehicle is steered by the steering wheel manipulated by the vehicle operator or the vehicle is steered by a force generated by an interplay between the wheel (tire) and road; and steering actuator control means (first ECU 40, S12, S20, S104, S108) for controlling the steering actuator to cancel the force generated by the interplay between the wheel (tire) and road if the vehicle is determined to be steered by the force when the brake is operated automatically.

In the system, the steering condition determining means includes: first steering amount detecting means (steer angle sensor 30, first ECU 40) installed at the steering system at a first position for generating an output indicative of an amount of steering (steer angle θ) input by the vehicle operator; and second steering amount detecting means (torque sensor 32, first ECU 40) installed at the steering system, at a second position which is closer to the wheels than the first position, for generating an output indicative of an amount of steering (steering force T) including a parameter indicative of the force generated by the interplay of the wheel and road; and wherein the steering condition determining means determines the condition of steering based on the outputs of the first and second steering amount detecting means (S14, S16, S18, S106).

In the system, the steering condition determining means determines the condition of steering based on times (t1, t2) at which the outputs of the first and second steering amount detecting means are generated (S14, S16, S18).

In the system, the first steering amount detecting means is a steer angle sensor (30) for generating the output indicative of a steer angle (θ) input by the vehicle operator and the second steering amount detecting means is a torque sensor (32) for generating the output indicative of a steering force (T) acting on the steering system.

In the system, the steering condition determining means determines the condition of steering based on polarities of the outputs of the first and second steering amount detecting means (S106).

In the system, the steering actuator control means discontinues controlling the steering actuator to cancel the force generated by the interplay of the wheel and road when the automatic braking operation is discontinued (S12, S22, S104, S116).

In the system, the steering actuator control means discontinues controlling the steering actuator to cancel the force generated by the interplay of the wheel and road when at least one of the outputs of the first and second steering amount detecting means is less than a reference value (θ0 or T0; S14, S16).

In the system, the steering actuator control means discontinues controlling the steering actuator to cancel the force generated by the interplay of the wheel and road when a change (dθ) of at least one of the outputs of the first and second steering amount detecting means, more specifically the first steering amount detecting means is less than a reference value (dθ0; S110).

In the system the steering actuator control means discontinues controlling the steering actuator to cancel the force generated by the interplay of the wheel and road when the polarities of the outputs of the first and second steering amount detecting means are equal (S112, S114).

In the above, although the torque sensor 32 is used to detect the steering force (the amount of steering) acting on the steering system, as shown by phantom lines in FIG. 1, it is alternatively possible to install a stroke sensor 80 in the proximity of the rack 22 to detect the stroke (travel) of the rack 22 and to use the sensor output to determine the steering force (the amount of steering).

It is alternatively possible to detect the axial force of the rack 22 using an appropriate sensor and to use the detected axial force to determine the steering force (steering amount). The reason is that, since the stroke or the axial force of the rack 22 varies in response to the force applied to the steering wheel, it is possible to determine the condition of steering by detecting the stroke or the axial force of the rack 22 and by comparing it with a reference value indicative of the steer angle.

It is further possible to install the rack stroke sensor 80 or the rack axial force sensor and to determine the condition of steering by comparing the sensor output with the torque sensor 32, not the steer angle sensor 30 installed upstream of the torque sensor 32. The reason is that it is possible to determine the condition of steering by detecting the time of change with a comparison of the output of the torque sensor 32 with the output of the rack stroke sensor 80 or the rack axial force sensor installed downstream of the torque sensor 32 (in other words, installed closer to the steered wheels W).

It is yet further possible to detect the rotational direction of the electric motor 26 based on the outputs of the current sensor 44 and the voltage sensor 46 and to determine the condition of steering by comparing the detected motor rotational direction with a result of the detected torque sensor 32. This is advantageous, since the steer angle sensor 30 can be omitted, rendering the configuration of the system simpler.

In the above, although the relative distance (threshold value) is determined in accordance with the characteristic a in FIG. 2, it is alternatively possible to add higher and lower characteristics b, c relative to the coefficient of tire/road interface friction $\mu$ in such a manner that when the estimated coefficient $\mu$ (estimated by comparing the output signals of the wheel speed sensors 34 of the driven wheels and idle wheels) is within a predetermined range, the characteristic a is selected to determine the relative distance for automatic braking, while the characteristic b or c is selected when the estimated coefficient $\mu$ is above or below the predetermined range.

In the above, although the electrically-operated power-assist steering system is used, any other mechanism such as a hydraulically-operated one can instead be used.

In the above, although the obstacle detection is conducted using the laser radar, any other detectors or sensors including a millimeter-wave radar or a visionary sensor such as a CCD camera may instead be used.

Although the invention has thus been shown and described with reference to specific embodiments, it should be noted that the invention is in no way limited to the details of the described arrangements but changes and modifications may be made without departing from the scope of the invention which is defined by the appended claims.

What is claimed is:

1. A system for controlling behavior of a vehicle having at least a brake and a steering system including a steering wheel to be manipulated by a vehicle operator, comprising:

automatic braking control means having an obstacle detector for detecting an obstacle present on a road on which the vehicle is traveling and for operating the brake automatically to avoid contact with the obstacle when a possibility of contact is found to exist;

a steering actuator installed in the steering system for steering wheels of the vehicle in a desired direction;

steering condition determining means for determining a condition of steering of the vehicle whether the vehicle is steered by the steering wheel manipulated by the vehicle operator or the vehicle is steered by a force generated by an interplay between the wheel and road; and steering actuator control means for controlling the steering actuator to cancel the force generated by the interplay between the wheel and road if the vehicle is determined to be steered by the force when the brake is operated automatically.

2. A system according to claim 1, wherein the steering condition determining means includes:

first steering amount detecting means installed at the steering system at a first position for generating an output indicative of an amount of steering input by the vehicle operator; and second steering amount detecting means installed at the steering system, at a second position which is closer to the wheels than the first position, for generating an output indicative of an amount of steering including a parameter indicative of the force generated by the interplay of the wheel and road; and wherein the steering condition determining means determines the condition of steering based on the outputs of the first and second steering amount detecting means.

3. A system according to claim 2, wherein the steering condition determining means determines the condition of steering based on times at which the outputs of the first and second steering amount detecting means are generated.

4. A system according to claim 3, wherein the first steering amount detecting means is a steer angle sensor for generating the output indicative of a steer angle input by the vehicle operator and the second steering amount detecting means is a torque sensor for generating the output indicative of a steering force acting on the steering system.

5. A system according to claim 2, wherein the steering condition determining means determines the condition of steering based on polarities of the outputs of the first and second steering amount detecting means.

6. A system according to claim 5, wherein the first steering amount detecting means is a steer angle sensor for generating the output indicative of a steer angle input by the vehicle operator and the second steering amount detecting means is a torque sensor for generating the output indicative of a steering force acting on the steering system.

7. A system according to claim 1, wherein the steering actuator control means discontinues controlling the steering actuator to cancel the force generated by the interplay of the wheel and road when the automatic braking operation is discontinued.

8. A system according to claim 2, wherein the steering actuator control means discontinues controlling the steering actuator to cancel the force generated by the interplay of the wheel and road when at least one of the outputs of the first and second steering amount detecting means is less than a reference value.

9. A system according to claim 2, wherein the steering actuator control means discontinues controlling the steering actuator to cancel the force generated by the interplay of the wheel and road when a change of at least one of the outputs of the first and second steering amount detecting means is less than a reference value.

10. A system according to claim 2, wherein the steering actuator control means discontinues controlling the steering actuator to cancel the force generated by the interplay of the wheel and road when the polarities of the outputs of the first and second steering amount detecting means are equal.

* * * * *